United States Patent Office 3,264,234
Patented August 2, 1966

3,264,234
DISPERSION POLYMERISATION OF MONOMER IN PRESENCE OF POLYMERIC SOLVATED CONSTITUENT
Desmond Wilfrid John Osmond, Iver Heath, England, assignor to Imperial Chemical Industries Limited, London, England, a corporation of Great Britain
No Drawing. Filed Dec. 4, 1961, Ser. No. 157,015
Claims priority, application Great Britain, Dec. 7, 1960, 42,103/60
8 Claims. (Cl. 260—4)

This invention relates to the manufacture of dispersions of synthetic polymer in organic liquid.

I have previously found that I can provide stable dispersions of polar synthetic polymers in relatively non-polar organic liquid, the dispersion being stabilised by block or graft copolymer of which one constituent is compatible with the polymer and incorporated in the disperse polymer particles and another is solvated by the organic liquid. Incorporation of the block or graft copolymer in the disperse particles results in the stabilising solvated constituent being firmly and irreversibly attached to the particles by the primary chemical bonds of the block or graft copolymer. This is in contrast to the use of conventional stabilising agents in which the stabilising solvatable groups become indirectly attached to the disperse particles through groups which themselves are merely adsorbed on to the surface of the disperse particles by second order forces.

One method of making such dispersions is by co-precipitating the polymer and the block or graft copolymer in the organic liquid, the polymer and copolymer being formed in situ by polymerising monomer and copolymerisable solvated constituent in the organic liquid in which the resulting polymer is to be dispersed. Polymerisation of the mixture results in the formation of polymer and of a block or graft copolymer of the solvated constituent and part of the monomer, the polymer and copolymer being co-precipitated as they are formed to produce a stable dispersion in the organic liquid.

Where the block or graft copolymer is formed in situ by copolymerisation of a solvated constituent with part of the monomer the rate of formation of the graft should not be grossly out of balance with the rate of formation of the polymer with which it is being precipitated; if the grafting reaction is carried to excess it will result in crosslinking of the solvated constituent in the organic liquid causing thickening or even gelation of the whole continuous phase.

It is desirable for some purposes, e.g. where the dispersion is to be used in coating compositions, to produce a dispersion of fine particle size, e.g., of average size $0.5\mu$, no particles being greater than $1.0\mu$, and yet of high solids content, e.g., at least 40% by weight.

For a given polymer, the particle size of the dispersion is largely dependent on the proportion of block or graft copolymer present during the precipitation of the disperse particles of polymer, the higher the proportion of block or graft copolymer, the finer being the dispersion. In a process in which all the ingredients are added at the commencement of the process it is difficult to build up an initial concentration of block or graft copolymer high enough to produce a dispersion of fine particle size and high solids content without continuing, during the remainder of the reaction, to generate block or graft copolymers at such a high rate as to give rise to danger of thickening or gelling the continuous phase.

According to the present invention a dispersion of synthetic polymer in organic liquid is prepared by polymerising monomer in solution in the organic liquid in the presence in solution of a solvated constituent which will form a block or graft copolymer with the monomer, characterized in that a minor proportion of the monomer is copolymerised with solvated constituent using an initiator for block or graft copolymerisation to form a fine dispersion containing block or graft copolymer, the residual initiator then being destroyed and the remainder of the monomer being polymerised using an initiator which has little or no tendency to initiate formation of block or graft copolymer.

In this way the first stage of the process is directed mainly to building up such a concentration of block or graft copolymer as will cause polymer to be precipitated in fine particles, and in the second stage the major part of the polymer is produced and precipitated with little or no further formation of block or graft copolymer.

The disperse polymer produced by the processes of this invention may be a homopolymer or copolymer, but is referred to throughout this specification as polymer.

All monomers which are polymerised by a chain type polymerisation of vinyl groups are suitable for use in this invention. Doubly unsaturated monomers such as butadiene and mixtures of various monomers may be used. Typical materials which are suitable as monomers in this invention include styrene, vinyl toluene, divinyl benzene, diisopropenyl benzene, allyl acetate, diallyl adipate, acrylonitrile, vinyl chloride, vinylidene chloride, vinyl propionate, vinyl acetate, vinyl stearate and acrylates and methacrylates of aliphatic alcohols such as ethyl, octyl, lauryl and natural fat alcohols. The preferred monomers for use in the production of polymers for the preparation of coating compositions by this process are methyl, butyl or $\beta$-ethoxy ethyl methacrylate, ethyl acrylate, vinyl acetate, acrylonitrile, methacrylic acid and acrylic acid, and the amides of these acids. Combinations of the above monomers may be used and other typical materials which are suitable for use as comonomers include dimethyl itaconate, diethyl maleate, maleic anhydride, and allyl alcohol.

As stated above the compatible constituent must also precipitate with the polymer and preferably the polymer chains of this constituent should be similar in length to those of the polymer to be dispersed. The solvated chain may range in size from that of a conventional stabilising agent up to a molecular weight of $10^6$ or more. However, since at chain lengths below about 1000 molecular weight relatively large proportions of solvated groups are required, and even then the dispersions tend to be rather coarse, I prefer to use solvated groups of at least 1000 molecular weight. Particularly satisfactory dispersions are obtained using solvated groups of from 1000 to 100,000 molecular weight, preferably 1500 to 10,000.

The nature of the solvated constituent is determined by the nature of the organic liquid in which the polymer is to be dispersed. In contrast to the disperse polymer this constituent of the block or graft copolymer should be of the same type as the solvent, e.g., both should be polar or both non-polar. Suitable combinations illustrative of the range from non-polar to polar, are polyisoprene with white spirit, polyisobutylene with petroleum hydrocarbons, unsaturated oil-modified alkyd with xylol, polyvinyl toluene with toluene, polystyrene with benzene, polymethyl acrylate with acetone and polyacrylic acid with ethyl alcohol.

In each of the two stages a different initiator is used. In the first stage where block or graft copolymer is formed, an initiator of relatively high activity is used. In the second stage, in which little or substantially no block or graft copolymer is formed, the polymerisation being largely that of the monomer alone, an initiator of lower activity is used.

A large range of suitable initiators for use in vinyl-type polymerisations is well known in the art. The compounds listed under the following "Group I" and "Group II" headings are representative of initiators suitable for use in the two stages of the reaction. The lists are not intended to be complete; other compounds of similar activity will be obvious to skilled persons.

GROUP I

Benzoyl peroxide
Ortho- or para-tolyl peroxide
Ortho- or para-tertiary butyl benzoyl peroxide
Ortho- or para-methoxy benzoyl peroxide
Tertiary butyl hydroperoxide
Ditertiary butyl peroxide
Cumene peroxide
Ditertiary butyl peroxalate
Tertiary butyl peracetate
Dimethyl thiuram disulphide

GROUP II

Diazodiisobutyronitrile
Diazodiethylonitrile (and similar diazodialkyl nitriles)
Ortho- or para-nitrobenzoyl peroxide
Dilauroyl peroxide
Lauroyl hydroperoxide
Dimethyl peroxalate
Methyl peracetate The first stage initiator is to be selected from Group I and the second stage initiator from Group II.

Whilst initiators in both groups are sufficiently energetic to activate the monomer molecules and initiate vinyl-type polymerisation, only those in Group I are sufficiently energetic to activate the reactive points of the solvatable constituent and so form block or graft copolymer. Clearly selection of the appropriate initiator from Group I will depend on the nature of the solvated constituent to be used. For example, a constituent which grafts only with difficulty, such as polyvinyl toluene, will require a very energetic initiator such as tertiary butyl hydroperoxide. But for an easily graftable material, such as natural rubber, less energetic aromatic peroxides such as benzoyl peroxide or tolyl peroxide are satisfactory.

Any residual initiator from the first stage may be destroyed by heating or preferably by addition of accelerators of initiator breakdown. For example, peroxides may be destroyed with amines or cobalt salts. The minor proportion of monomer reacted at the first stage should be at least equal to the weight of solvated constituent. Since, in the process of this invention, the solvated constituent is used more efficiently than in a normal batch process, a suitable proportion of solvated constituent is from 1–5% by weight of total monomer, preferably 1.5–2.5%. The minor proportion of monomer should, however, not exceed 25% of the total monomer and preferably is in the range 5–15% of the total monomer. The monomer should be added in two stages, the major proportion preferably being added at the end of the first stage. If the minor proportion reacted in the first stage is within the preferred range of 5–15% of the total monomer it is possible to add the remainder of the monomer in the second stage without having first to cool the batch.

The process of this invention is particularly applicable to the preparation of dispersions of acrylic polymers. By acrylic polymers I mean polymers of, or copolymers the major constituent of which is, acrylic acid or methacrylic acid or an ester, amide or nitrile of either acid, or mixtures of the acids and the derivatives. Suitable esters are those of alcohols containing 1–8 carbon atoms, those of alcohols containing 1–4 carbon atoms being particularly useful. The preferred monomers for use in the production of polymer dispersions for use in coating compositions are methyl methacrylate, 2-ethoxy ethyl methacrylate, ethyl acrylate, acrylonitrile, methacrylic acid and acrylic acid, and amides of these acids. Combinations of these monomers may be used. Other copolymerisable monomers, such as dimethyl maleate and maleic anhydride, may also be used in minor proportion. These types of polymers are suitably dispersed in non-polar liquids such as aliphatic hydrocarbons, long chain ketones or alcohols or mixtures thereof, using as solvated constituent of the block or graft copolymer natural rubber, e.g., crepe or gutta-percha, preferably degraded, liquid polybutadiene or other synthetic rubber unsaturated in the principal C—C chain and solvated by the liquid. Such dispersions are particularly suitable for use in coating compositions.

The invention is illustrated by the following examples in which parts are by weight.

*Example 1*

A. To provide a basis for comparison this first preparation makes use of the same initiator in both stages and illustrates the result of excess block or graft copolymer formation in the second stage.

Into a glass reactor equipped with reflux condenser vented to air, stirrer, heating jacket, cooling coil with thermostatic control, batch thermometer, and inert gas inlet, was charged:

| | Parts by weight |
|---|---|
| White spirit | 100 |
| Methyl methacrylate | 10 |
| Degraded rubber | 2.6 |
| Benzoyl peroxide | 1.0 |

This charge was heated to 75° C. under oxygen-free nitrogen and maintained there by the thermostatically controlled cooling coil, for one hour. The product of this stage was a fluid, low solids, extremely fine particle size, opalescent dispersion, the disperse phase consisting largely of block or graft copolymer.

The temperature was reduced to 60° C. to check the reaction and 100 parts of methyl methacrylate and a further 1.0 part of benzoyl peroxide added via the reflux condenser. The temperature was again raised to 75° C. when a strongly exothermic reaction occurred. The batch rapidly thickened and gelled after some 15 minutes when the solids content was about 35%. The particles of polymer dispersed in the jelly-like continuous phase were of exceptionally fine particle size.

B. Part A was repeated, save that, at the end of the first stage 3 gms. of triethylamine were added, and 0.67 gm. of azodiisobutyronitrile were used in place of the 1.0 gm. of benzoyl peroxide in the second stage.

A very sharp exothermic reaction peak was observed and the reaction was completed in 1½ hrs. The final product was a readily pourable, thin, cream containing 56% solids polymer, this being finely dispersed though not quite of such fine particle size as in the product of Part A.

*Example 2*

Into the apparatus of Example 1 was charged:

| | Parts by weight |
|---|---|
| Petroleum ether (boiling range 60–80° C.) | 60 |
| White spirit | 30 |
| Xylol | 10 |
| Methyl methacrylate | 10 |
| Methacrylic acid | 0.5 |
| Degraded rubber | 2.5 |
| Benzoyl peroxide | 0.9 |

Instead of having an atmosphere of nitrogen in the reactor this mixture was raised to reflux temperature (about 70° C.) and reacted for one hour. The temperature was lowered to 60° C. to check the reaction and a mixture of the following was added over 30 minutes:

| | Parts by weight |
|---|---|
| Methyl methacrylate | 80 |
| Methacrylic acid | 9 |
| Aniline | 5 |
| Azodiisobutyronitrile | 0.5 |

The temperature was again raised to the reflux point. There was a rapid reaction and some cooling was necessary to avoid overloading the reflux condenser. After 2 hours a fluid, fine particle size dispersion of 52% solids was obtained.

*Example 3*

Example 1, Parts A and B were repeated, using in place of benzoyl peroxide (i.e., in both stages of Part A, and in the first stage of Part B) 0.3 gm. of tertiary butyl hydroperoxide. Essentially similar results were obtained.

*Example 4*

Into the apparatus of Example 1 was charged:

| | Parts by weight |
|---|---|
| Solid gutta-percha | 25 |
| White spirit | 250 |
| Xylol | 250 |

This was heated to 90° C., stirred until the gutta-percha was fully dissolved, and cooled to 40° C.

The following ingredients were premixed and added to the gutta-percha solution:

| | Parts by weight |
|---|---|
| 60–80° C. boiling petroleum ether | 500 |
| Acrylonitrile | 50 |
| Ethyl acrylate | 26 |
| Acrylamide | 10 |
| Benzoyl peroxide | 10 |

The whole charge was then heated to reflux at approximately 70° C. for one hour, after which time a fine, fluid, latex had been formed. 5 parts of triethylamine were added, and the charge refluxed for a further 5 minutes. The following monomer mixture:

| | Parts by weight |
|---|---|
| Acrylonitrile | 450 |
| Ethyl acrylate | 230 |
| Acrylamide | 10 |
| Azodiisobutyronitrile | 5 | was then fed into the returning reflux stream over 2 hours. The batch was held at reflux temperature for a further 15 minutes and cooled to room temperature under inert gas.

The final product, after the removal of a few bits by filtration, was a fluid, very fine particle size, stable dispersion of 42% solids.

I claim:

1. In a process for producing a dispersion of a solid synthetic polymer in an inert organic liquid in which the polymer is insoluble, by polmerizing at least one ethylenically unsaturated monomer which is polymerizable by addition polymerization in solution in said organic liquid in the presence, in solution, of a polymeric solvated constituent which will react with said monomer to form a member of the group consisting of block and graft copolymers; the improvement which comprises first copolymerizing a minor proportion of said monomer with said solvated constituent in the presence of an initiator for inducing formation of said member of the group consisting of block and graft copolymers to form a fine dispersion containing said member of the group consisting of block and graft copolymers, destroying the residual initiator and then polymerizing the remainder of said monomer in the presence of an initiator which predominantly initiates addition polymerization of said monomer and has only little tendency to initiate formation of said member of the group consisting of block and graft copolymers, said minor proportion of monomer being at least about equal in weight to said solvated constituent but not exceeding 25% by weight of the total monomer.

2. An improved process as claimed in claim 1 in which the solvated constituent is used in a proportion of from 1 to 2.5% by weight of the total monomer.

3. A process as claimed in claim 1 in which said monomer is a member of the group consisting of acrylic acid, methacrylic acid, lower esters, amides and nitriles thereof.

4. A process as claimed in claim 1 in which the monomer is added in two stages, only a minor proportion being present during the formation of the member of the group consisting of block and graft copolymers.

5. An improved process as claimed in claim 4 in which the minor proportion is from 5–15% of the total monomer.

6. A polymer dispersion made by a process claimed in claim 1.

7. A coating composition comprising a polymer dispersion as claimed in claim 6, a plasticiser for the polymer and a dispersed pigment.

8. An article which has been coated with a composition as claimed in claim 7.

References Cited by the Examiner

UNITED STATES PATENTS

| 2,891,018 | 6/1959 | Millane | 260—4 |
| 2,913,426 | 11/1959 | Li et al. | 260—4 |
| 3,037,948 | 6/1962 | Landler et al. | 260—4 |
| 3,095,388 | 6/1963 | Osmond et al. | 260—879 |

OTHER REFERENCES

Allen et al., Jour. Polymer Science, vol. XXII, pp. 193–201 (1956).

MURRAY TILLMAN, *Primary Examiner.*

LEON J. BERCOVITZ, *Examiner.*

J. W. SANNER, G. F. LESMES, *Assistant Examiners.*